United States Patent
Matsuoka et al.

(10) Patent No.: US 12,337,756 B2
(45) Date of Patent: Jun. 24, 2025

(54) ATTENTION CALLING SYSTEM AND ATTENTION CALLING METHOD

(71) Applicant: HONDA MOTOR CO., LTD., Tokyo (JP)

(72) Inventors: Takahiro Matsuoka, Wako (JP); Masayuki Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 18/455,923

(22) Filed: Aug. 25, 2023

(65) Prior Publication Data
US 2024/0092260 A1    Mar. 21, 2024

(30) Foreign Application Priority Data
Sep. 20, 2022 (JP) ................. 2022-149023

(51) Int. Cl.
*B60Q 5/00* (2006.01)
*B60Q 9/00* (2006.01)
*G08G 1/16* (2006.01)

(52) U.S. Cl.
CPC ............. *B60Q 5/006* (2013.01); *B60Q 9/008* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 9,120,447 | B1* | 9/2015 | Moldestad | ............. B60R 21/34 |
| 9,406,230 | B2* | 8/2016 | Kuroba | .................... G08G 1/16 |
| 11,423,783 | B2* | 8/2022 | Lee | ..................... B60W 50/082 |
| 11,427,221 | B2* | 8/2022 | Meyer | ................ B60W 30/165 |
| 2001/0012976 | A1* | 8/2001 | Menig | .................... B60K 35/60 |
| | | | | 701/1 |
| 2004/0119818 | A1* | 6/2004 | Mukaiyama | ........... G08G 1/166 |
| | | | | 348/113 |
| 2008/0042812 | A1* | 2/2008 | Dunsmoir | ............ G06V 20/582 |
| | | | | 348/148 |
| 2009/0265107 | A1 | 10/2009 | Matsuno | |

(Continued)

FOREIGN PATENT DOCUMENTS

| | | |
|---|---|---|
| JP | 2005-010893 A | 1/2005 |
| JP | 2009-262629 A | 11/2009 |

*Primary Examiner* — Muhammad Adnan
(74) *Attorney, Agent, or Firm* — Rankin, Hill & Clark LLP

(57) ABSTRACT

An attention calling system includes a time headway (THW) acquisition unit repeatedly acquiring THW at predetermined time intervals, the THW being a value obtained by dividing an inter-vehicle distance between an own vehicle and a preceding vehicle by vehicle speed of the own vehicle, a time to collision (TTC) acquisition unit repeatedly acquiring TTC at predetermined time intervals, the TTC being a value obtained by dividing the inter-vehicle distance by relative speed between the own vehicle and the preceding vehicle, and a notification unit outputting to an occupant of the own vehicle an approach alarm that notifies an approach to the preceding vehicle, based on the THW and the TTC. The notification unit determines a saliency level that is a degree of saliency of the approach alarm in accordance with the THW and the TTC, and outputs the approach alarm of the determined saliency level.

5 Claims, 5 Drawing Sheets

(56) References Cited

U.S. PATENT DOCUMENTS

| | | | |
|---|---|---|---|
| 2015/0066347 A1* | 3/2015 | Lee | B60W 30/0953 |
| | | | 701/301 |
| 2017/0225617 A1* | 8/2017 | Morimura | G06V 40/10 |
| 2017/0291543 A1* | 10/2017 | Goldman-Shenhar | B60Q 9/00 |
| 2018/0253904 A1* | 9/2018 | Kuwabara | G08G 1/167 |
| 2020/0186979 A1* | 6/2020 | Liu | H04W 40/248 |
| 2022/0187449 A1* | 6/2022 | Laoufi | G01S 13/52 |
| 2023/0036695 A1* | 2/2023 | Hwang | H04W 4/12 |
| 2023/0377463 A1* | 11/2023 | Kang | B60W 50/14 |
| 2024/0092260 A1* | 3/2024 | Matsuoka | G08G 1/166 |
| 2024/0144828 A1* | 5/2024 | Sato | G08G 1/166 |
| 2024/0208412 A1* | 6/2024 | Matsuoka | B60Q 9/008 |

* cited by examiner

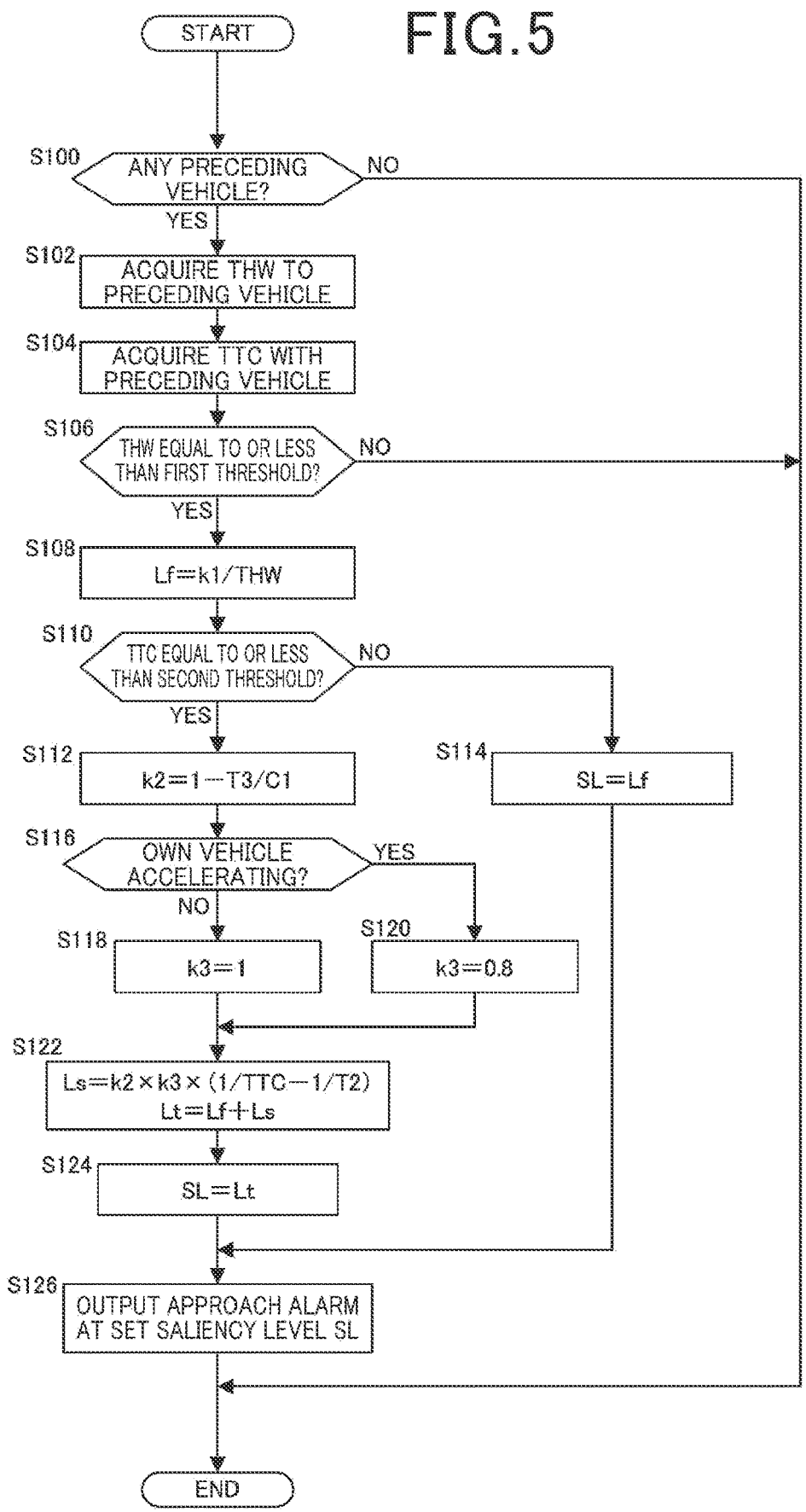

ATTENTION CALLING SYSTEM AND ATTENTION CALLING METHOD

INCORPORATION BY REFERENCE

The present application claims priority under 35 U.S.C. § 119 to Japanese Patent Application No. 2022-149023 filed on Sep. 20, 2022. The content of the application is incorporated herein by reference in its entirety.

BACKGROUND OF THE INVENTION

Field of the Invention

The present invention relates to an attention calling system and an attraction calling method that calls attention of the driver of a vehicle.

Description of the Related Art

In recent years, there is an increased effort to provide access to sustainable transportation systems in consideration of even those vulnerable among traffic participants. In order to achieve this goal, research and development efforts are made for further improvement in traffic safety and convenience through research and development related to preventive safety techniques.

Japanese Patent Laid-Open No. 2009-262629 discloses brake control or the like of an own vehicle. When the own vehicle is traveling between a preceding vehicle and a following vehicle, the brake control is performed based on a risk of collision Rf, which is calculated from time headway THWf and time to collision TTCf between the own vehicle and the preceding vehicle, and a risk of collision Rf with the following vehicle, which is calculated from the time headway THWf and the time to collision TTCf between the own vehicle and the following vehicle.

Japanese Patent Laid-Open No. 2005-10893 discloses that automatic braking is initiated when time to collision TTC with a preceding vehicle is lower than a prescribed threshold and that the threshold is changed depending on relative speed with respect to the preceding vehicle.

In the preventive safety techniques, in view of driver's acceptance and understanding of the risk of contact, there is a need to notify to the driver of an own vehicle the magnitude of a temporally changing risk of contact between the own vehicle and the preceding vehicle, in a manner similar to the driver intuitively grasping the risk from the behavior of the preceding vehicle.

In order to meet the above need, an object of the present invention is to notify to the driver of an own vehicle the magnitude of a temporally changing risk of collision between the own vehicle and a preceding vehicle, in a manner highly consistent with the perception of a skilled driver. Accordingly, the present invention contributes to the development of sustainable transportation systems.

SUMMARY OF THE INVENTION

A first aspect of the present invention is an attention calling system. The attention calling system includes a time headway (THW) acquisition unit that repeatedly acquires THW at predetermined time intervals, the THW being a value obtained by dividing an inter-vehicle distance between an own vehicle and a preceding vehicle by vehicle speed of the own vehicle, a time to collision (TTC) acquisition unit that repeatedly acquires TTC at predetermined time intervals, the TTC being a value obtained by dividing the inter-vehicle distance by relative speed between the own vehicle and the preceding vehicle, and a notification unit that outputs to an occupant of the own vehicle an approach alarm that notifies an approach to the preceding, based on the THW and the TTC. The notification unit determines a saliency level that is a degree of saliency of the approach alarm in accordance with the THW and the TTC, and outputs the approach alarm of the determined saliency level.

According to another aspect of the present invention, when the THW becomes equal to or less than a first threshold, the notification unit may set the saliency level to a magnitude of a first level that monotonically increases as the THW decreases, and when the THW is equal to or less than the first threshold and the TTC becomes equal to or less than a second threshold, the notification unit may set the saliency level to a magnitude of a third level that is obtained by adding a second level to the first level, the second level increasing monotonically as the TTC decreases.

According to another aspect of the present invention, the notification unit may calculate the first level that increases monotonically with respect to an inverse number of the THW, and calculate the second level that increases monotonically with respect to an inverse number of the TTC.

According to another aspect of the present invention, the notification unit may set the second level to a larger value as the value of the THW when the TTC becomes equal to or less than the second threshold is smaller.

According to another aspect of the present invention, when the own vehicle is accelerating, the notification unit may set the second level to a smaller value than when the own vehicle is not accelerating.

Another aspect of the present invention is an attention calling method executed by a computer of an attention calling system. The method includes a time headway (THW) acquisition step of repeatedly acquiring THW at predetermined time intervals, the THW being a value obtained by dividing an inter-vehicle distance between an own vehicle and a preceding vehicle by vehicle speed of the own vehicle, a time to collision (TTC) acquisition step of repeatedly acquiring TTC at predetermined time intervals, the TTC being a value obtained by dividing the inter-vehicle distance by relative speed between the own vehicle and the preceding vehicle, and a notification step of outputting to an occupant of the own vehicle an approach alarm that notifies an approach to the preceding, based on the THW becomes the TTC. In the notification step, a saliency level that is a degree of saliency of the approach alarm is determined in accordance with the THW and the TTC, and the approach alarm of the determined saliency level is output.

The aspects of the present invention make it possible to notify to the driver of an own vehicle the magnitude of a temporally changing risk of collision between the own vehicle and a preceding vehicle, in a manner highly consistent with the perception of the driver.

BRIEF DESCRIPTION OF THE DRAWINGS

FIG. 5 is a flowchart showing the processing procedure of an attention calling method executed by the attention calling system.

DETAILED DESCRIPTION OF THE PREFERRED EMBODIMENTS

Hereinafter, embodiments of the present invention will be described with reference to the drawings.

Figure 1:
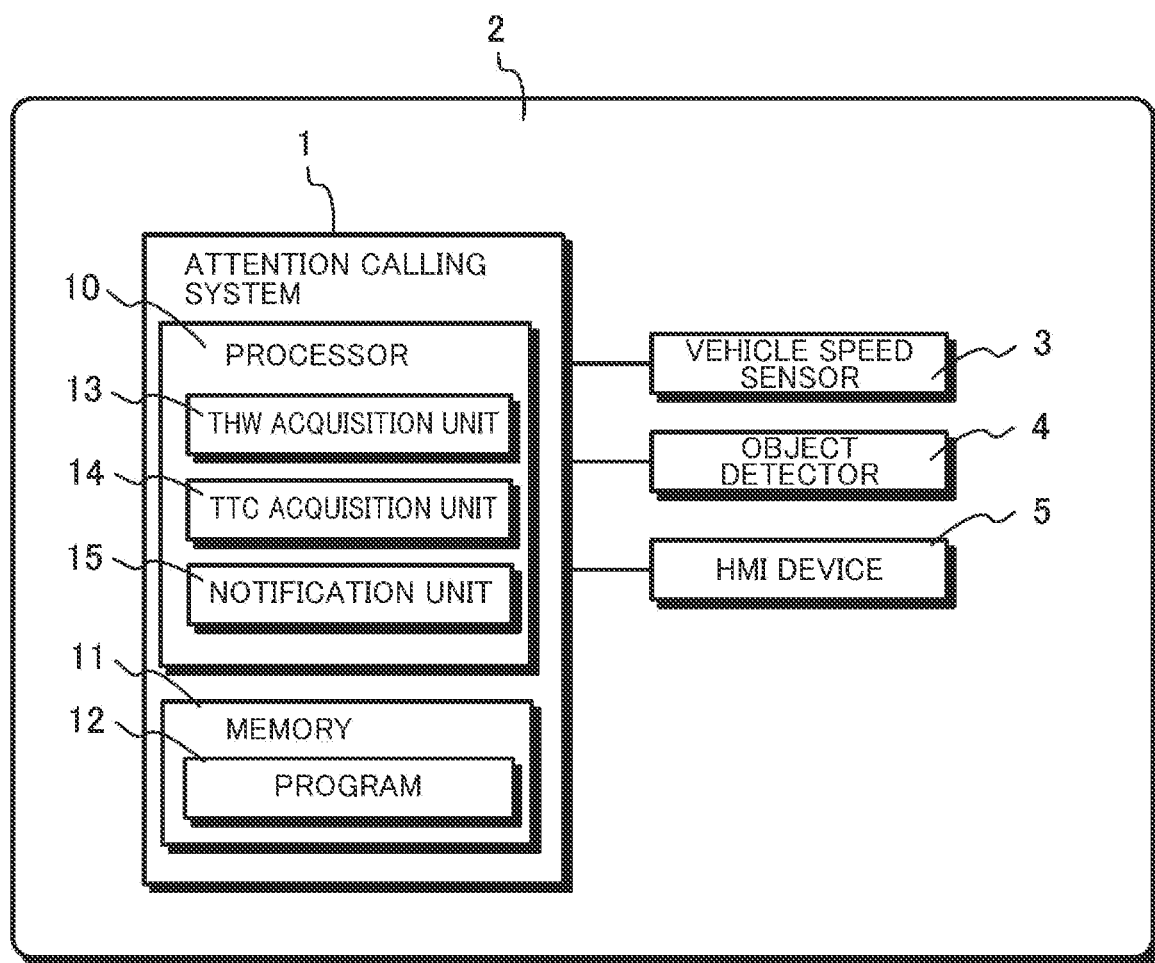
FIG. 1 shows the configuration of an attention calling system according to one embodiment of the present invention.

FIG. 1 shows the configuration of an attention calling system 1 according to one embodiment of the present invention.

The attention calling system 1 is mounted on an own vehicle 2 to output an approach alarm that notifies to the driver of the own vehicle 2 an approach to a preceding vehicle. In this context, the 'own vehicle' refers to the vehicle mounted with the attention calling system 1.

The own vehicle 2 includes a vehicle speed sensor 3 that detects the vehicle speed of the own vehicle 2, an object detector 4 that detects an object in front of the own vehicle 2, and a human machine interface (HMI) device 5 provided in a vehicle cabin of the own vehicle 2. Examples of the object detector 4 may include a camera, a radar, a LIDAR, and/or a sonar. The HMI device 5 is, for example, a speaker. The speaker is merely an example, and the HMI device 5 may be any device that can notify to the occupants of the own vehicle 2 including the driver an approach alarm in various ways. Examples of the HMI device 5 may include, in addition to the speaker, an electric seatbelt provided in a driver seat of the own vehicle 2 so as to be able to vary the tension (or fastening force) of a seat belt of the driver seat, a vibration device provided in a steering handle of the own vehicle 2 so as to be able to provide vibration of various intensity to the steering wheel, or a display device.

The attention calling system 1 includes a processor 10 and a memory 11. The memory 11 is constituted of, for example, a volatile and/or non-volatile semiconductor memory, and/or a hard disk device, etc. The processor 10 is a computer including a CPU, for example. The processor 10 may be configured to include a ROM having programs written therein, a RAM for temporary data storage, and so on. The processor 10 includes, as a functional element or a function unit, a THW acquisition unit 13, a TTC acquisition unit 14, and a notification unit 15.

These functional elements included in the processor 10 are implemented when the processor 10 that is a computer executes a program 12 stored in the memory 11. The program 12 may be stored in any computer-readable storage medium. Alternatively, all or some of the functional elements included in the processor 10 may each be constituted of hardware including one or more electronic components.

The THW acquisition unit 13 repeatedly acquires time headway (THW) of the own vehicle 2 to a preceding vehicle traveling ahead of the own vehicle 2 at predetermined time intervals. For example, the THW acquisition unit 13 acquires a current inter-vehicle distance between the preceding vehicle and the own vehicle 2 from the object detector 4 and acquires a current vehicle speed of the own vehicle 2 from the vehicle speed sensor 3 at predetermined time intervals. The THW acquisition unit 13 then acquires a current THW by dividing the current inter-vehicle distance by the current vehicle speed of the own vehicle 2.

The TTC acquisition unit 14 repeatedly acquires a current time to collision (TTC) of the own vehicle 2 with respect to the preceding vehicle 2 with the preceding vehicle at predetermined time intervals. For example, the TTC acquisition unit 14 acquires the current inter-vehicle distance between the preceding vehicle and the own vehicle 2 from the object detector 4 at predetermined time intervals. The TTC acquisition unit 14 then calculates a current relative speed between the preceding vehicle and the own vehicle 2 from the temporal change of the inter-vehicle distance acquired at the predetermined time intervals, divides the current inter-vehicle distance by the calculated current relative speed, and acquires the resultant value as the current TTC.

The notification unit 15 outputs to an occupant of the own vehicle 2, through the HMI device 5, an approach alarm notifying an approach of the own vehicle 2 to the preceding vehicle, based on the THW and the TTC repeatedly acquired by the THW acquisition unit 13 and the TTC acquisition unit 14.

In the present embodiment in particular, the notification unit 15 determines a saliency level that is the degree of saliency of the approach alarm in accordance with the THW and the TTC, and outputs the approach alarm of the determined saliency level through the HMI device.

Hence, the attention calling system 1 outputs an approach alarm at the saliency level that is determined based on the THW indicating the closeness to the preceding vehicle and the TTC indicating the level of approach to the preceding vehicle. This makes it possible to notify to the driver of the own vehicle the magnitude of a temporally changing risk of collision between the own vehicle and the preceding vehicle, in a manner highly consistent with the perception of the driver.

Here, the degree of saliency of the approach alarm refers to how strong the approach alarm calls or attracts the attention of a person.

For example, when the approach alarm is output as sound or vibration, the saliency level is defined by the intensity, frequency, frequency change period, or repetition period of the sound or vibration. The saliency level of the approach alarm provided by sound or vibration is higher as the intensity is higher, the frequency is higher, the frequency change period is shorter, and the repetition period is shorter.

Alternatively, when the approach alarm is output as the tension of the electric seat belt, the saliency level is defined by the magnitude of the tension, and therefore the saliency level of the approach alarm is higher as the tension is larger.

Alternatively, when the approach alarm is output as graphic elements such as characters or graphics displayed on the display device, the saliency level may be defined by the brightness, brightness change period, blinking period, or color tone of the graphic elements to be displayed. For example, the saliency level of the approach alarm is higher as the brightness is higher, the brightness change period or the blinking period is shorter, or the color tone shifts farther to warm color from cold color.

Specifically, when the THW becomes equal to or less than a first threshold T1, the notification unit 15 sets the saliency level to the magnitude of a first level that increases monotonically as the THW decreases. When the THW is equal to or less than the first threshold T1 and the TTC becomes equal to or less than a second threshold T2, the notification unit 15 sets the saliency level to the magnitude of a third level that is obtained by adding to the first level a second level that increases monotonically with the decrease of the TTC.

As a result, until the TTC becomes equal to or less than the second threshold T2, the approach alarm is output at the saliency level corresponding only to the THW. This makes it possible to prevent an excessive approach alarm from being given to annoy the driver during the period where the risk of contact between the preceding vehicle and the own vehicle 2 is relatively low. During the period where the TTC becomes equal to or less than the second threshold T2 so that there is an urgent risk of contact, the approach alarm is output at the saliency level that is obtained by adding the level corresponding to the TTC, and therefore it is possible to notify the driver the urgent risk of contact.

For example, the notification unit 15 calculates the first level so as to monotonically increase with respect to an inverse number of the THW, and calculates the second level so as to monotonically increase with respect to an inverse number of the TTC.

As a result, the saliency level does not increase linearly with the decrease of the THW and the TTC, but an increase rate of the saliency level increases as the THW and the TTC decreases. Therefore, the saliency level can vary in the manner closer to the perception or the sense of the driver caused by the approach of the preceding vehicle. This makes it possible to further enhance the driver's acceptance and understanding of the approach alarm.

More specifically, the notification unit 15 calculates a first level value Lf, a second level value Ls, and a third level value Lt in following expressions:

$$Lf=k1/\text{THW} \quad (1)$$

$$Ls=k2 \times k3 \times (1/\text{TTC}-1/T2) \quad (2)$$

$$Lt=Lf+Ls \quad (3)$$

where k1, k2, and k3 are proportional coefficients.

The notification unit 15 sets a saliency level SL by a following expression:

SL=$Lf$ when TTH≤$T1$ and TTC>$T2$, and $$SL=Lt \text{ when TTH} \leq T1 \text{ and TTC} \leq T2 \quad (4)$$

In setting the saliency level, the notification unit 15 may set the second level Ls to a larger value as the THW value when the TTC becomes equal to or less than the second threshold T2 is smaller. As a result, as the inter-vehicle distance at the moment when the TTC becomes equal to or less than the second threshold T2 is smaller, the saliency level of the approach alarm thereafter can be increased more so as to notify the urgency of the risk of contact to the driver.

For example, the notification unit 15 calculates the proportional coefficient k2 in the expression (2) by a following expression:

$$k2=1-T3/C1 \quad (5)$$

where T3 is the value of THW when the TTC becomes equal to or less than the second threshold T2, and C1 is a coefficient.

The notification unit 15 may also sets the second level Ls when the own vehicle 2 is accelerating to a smaller value than when the own vehicle is not accelerating. As a result, the saliency level of the approach alarm when the driver is intentionally accelerating the own vehicle 2, as in the case where the own vehicle 2 attempts to overtake a preceding vehicle, is lower than the saliency level when the driver is not accelerating the own vehicle 2. This makes it possible to prevent the excessive approach alarm from annoying the driver.

For example, the notification unit 15 determines the proportional coefficient k3 in the expression (2) by a following expression:

k3=1 when the own vehicle 2 is not accelerating, and $$k3<1 \text{ (for example, } k3=0.8\text{) when the vehicle 2 is accelerating} \quad (6)$$

For example, when the value of acceleration, calculated from the value of vehicle speed obtained from the vehicle speed sensor 3 at predetermined time intervals, is equal to or more than a prescribed threshold set in advance, the notification unit 15 can determine that the own vehicle 2 is accelerating. Alternatively, the notification unit 15 can determine that the own vehicle 2 is accelerating, when the amount of change in a pressing amount of an accelerator pedal is equal to or more than a predetermined threshold based on information from an accelerator pedal sensor (not shown) included in the own vehicle 2.

Figure 2:
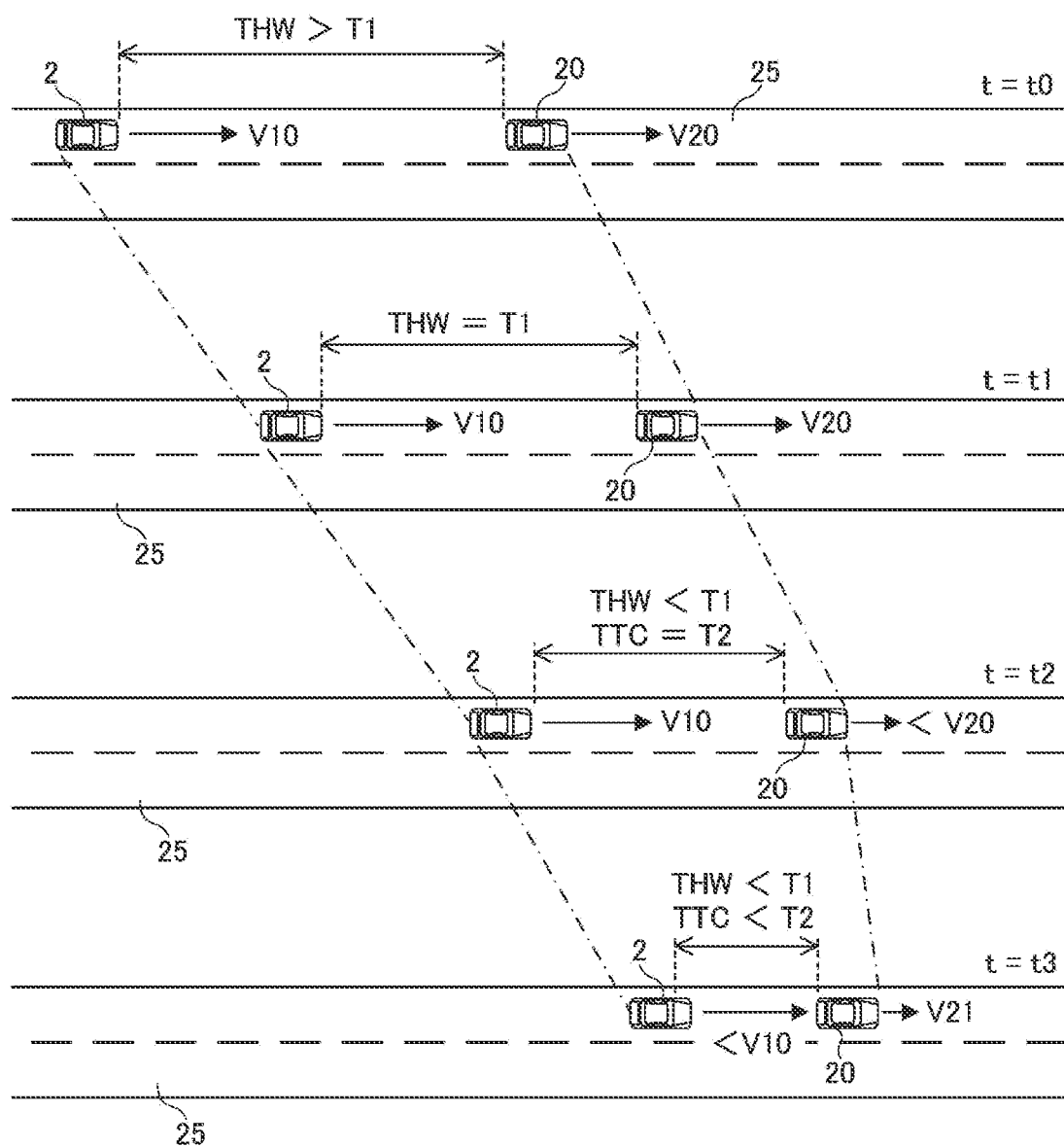
FIG. 2 shows an example of a scene encountered by an own vehicle while the own vehicle is traveling on road.
Figure 3:
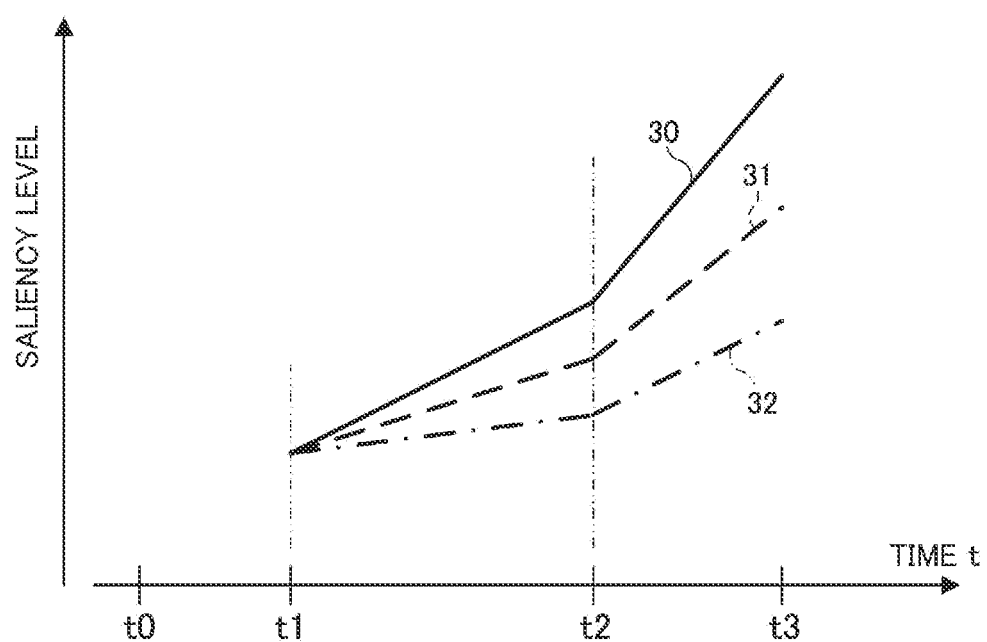
FIG. 3 is an explanatory view about an example of time transition of a saliency level in the scene shown in FIG. 2.

Next, FIGS. 2 and 3 are used to illustrate an example of the time transition in the saliency level of the approach alarm output from the notification unit 15.

FIG. 2 shows an example of a scene encountered by the own vehicle 2 during traveling on road. FIG. 3 is an explanatory view about an example of the time transition of the saliency level in the scene shown in FIG. 2.

FIG. 2 includes uppermost to lowermost views arranged to show the positions of the own vehicle 2 and a preceding vehicle 20 that are traveling on a road 25 at time t0, t1, t2, and t3.

In FIG. 3, the horizontal axis indicates time, and the vertical axis indicates the saliency level. Graphs 30, 31, and 32 show the temporal change of the saliency level.

In the scene shown in FIG. 2, at time t0, the own vehicle 2 and the preceding vehicle 20 are both traveling at constant speeds: the own vehicle 2 at a vehicle speed of V10; and the preceding vehicle 20 at a vehicle speed of V20 (the uppermost view in FIG. 2). In the scene, the vehicle speed V20 of the preceding vehicle 20 is slightly slower than the vehicle speed V10 of the own vehicle 2 (V20<V10), and the THW between the preceding vehicle 20 and the own vehicle 2 gradually decreases.

At time t1, the THW between the preceding vehicle 20 and the own vehicle 2 passes through the first threshold T1 (the second view in FIG. 2), and decreases further with the passage of time.

Then, while the vehicle 2 is traveling at the constant speed, the preceding vehicle 20 starts decelerating from the vehicle speed V20. The TTC between the preceding vehicle 20 and the own vehicle 2 passes through the second threshold T2 at time t2 (the third view in FIG. 2), and further decreases.

Then, after the preceding vehicle 20 reaches a vehicle speed V21 (<V20), the own vehicle 2 starts decelerating from the vehicle speed V10 at time t3, and the TTC starts to increase (the lowermost view in FIG. 2).

The graphs 30, 31, and 32 in FIG. 3 show the respective temporal changes in the saliency level in three cases where, for example, the THW value when the TTC passes through the second threshold T2 at time t2 is different depending on the magnitude of speed difference between the vehicle speed V10 of the own vehicle 2 and the vehicle speed V20 of the preceding vehicle 20.

When the TTC passes through the second threshold T2, the THW value is the largest in the graph 32, the smallest in the graph 30, and is a middle value in the graph 31 in FIG. 3. Here, since the saliency level during a period from time t1 to t2 is set to the first level Lf in the expression (1) that is proportional to the inverse number of the THW, the graph 32 with the highest THW at time t2 indicates the lowest saliency level among the graphs 30 to 32. The graphs 30, 31, and 32 schematically show the changes in the saliency level, and an actual saliency level can change like a curved line.

As described above, according to the proportional coefficient k2 in the expression (5), the notification unit 15 sets the second level Ls indicated in the expression (2) to a larger value, as the THW value when the TTC becomes equal to or less than the second threshold T2 is smaller. Accordingly, an inclination during the period from time t2 to t3 is the largest in the graph 30 and the smallest in the graph 32.

Since the own vehicle 2 starts decelerating at time t3, the saliency level starts decreasing at time t3 in each of the graphs 30, 31, and 32 (not shown).

Figure 4:
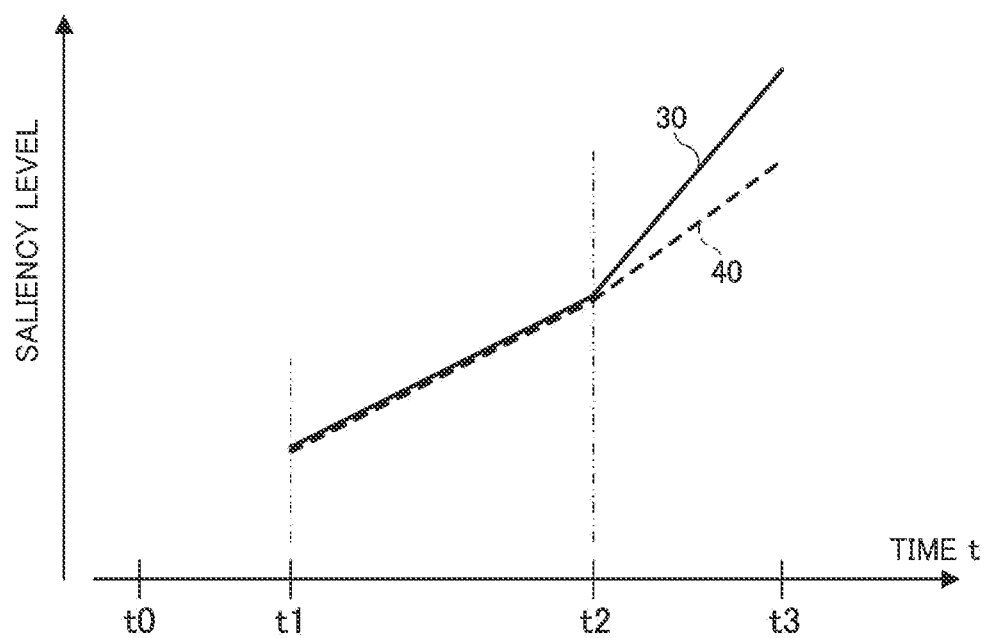
FIG. 4 shows a difference in time transition of the saliency level between the case where the own vehicle is accelerating and the case where the own vehicle is not accelerating.

Although the factor that causes the TTC to pass through the second threshold T2 at time t2 is the deceleration of the preceding vehicle 20 in the scene shown in FIG. 2, the factor may be the acceleration of the own vehicle 2. FIG. 4 shows a difference in time transition of the saliency level between the case where the own vehicle 2 is accelerating and the case where the own vehicle 2 is not accelerating at time t2 when the TTC passes through the second threshold T2. The vertical and the horizontal axes in FIG. 4 are the same as in FIG. 3.

A graph 30 shown in FIG. 4, which is the same as the graph 30 shown in FIG. 3, indicates the time transition of the saliency level in the scene of FIG. 2 where the own vehicle 2 is traveling at the constant speed at time t2. In contrast, a graph 40 shown in FIG. 4 indicates the time transition of the saliency level in the case where the vehicle 2 is accelerating at time t2.

As described above, according to the proportional coefficient k3 shown in the expression (6), when the own vehicle 2 is accelerating, the notification unit 15 sets the second level Ls indicated in the expression (2) to a smaller value than when the own vehicle is not accelerating. Accordingly, an inclination of the graph 40 during the period from time t2 to t3 is smaller than that of the graph 30.

Next, an operation procedure in the attention calling system 1 is described.

FIG. 5 is a flowchart showing the processing procedure of an attention calling method executed by the processor 10 that is the computer of the attention calling system 1. The processing is repeatedly executed at predetermined time intervals.

Once the processing is started, the notification unit 15 determines whether or not there is a preceding vehicle ahead of the own vehicle 2, based on information from the object detector 4 that detects an object ahead of the own vehicle 2 (S100). When there is no preceding vehicle ahead of the own vehicle 2 (S100, NO), the notification unit 15 ends the processing.

When there is a preceding vehicle ahead of the vehicle 2 (S100, YES), the THW acquisition unit 13 acquires the THW of the own vehicle to the preceding vehicle (S102). The TTC acquisition unit 14 acquires the TTC with the preceding vehicle (S104). As described above, since the processing shown in FIG. 5 is repeatedly executed at predetermined time intervals, the THW and the TTC are repeatedly acquired at the predetermined time intervals in steps S102 and S104. Here, steps S102 and S104 correspond to the THW acquisition step and the TTC acquisition step in the present disclosure, respectively. The processing from steps S106 to S126 described later corresponds to the notification step in the present disclosure.

Next, the notification unit 15 determines whether or not the THW acquired in step S102 is equal to or less than the first threshold T1 (S106). When the THW is not equal to or less than the first threshold T1 (S106, NO), the notification unit 15 ends the processing.

When the THW is equal to or less than the first threshold T1 (S106, YES), the notification unit 15 calculates the first level Lf using the above expression (1) (S108).

Next, the notification unit 15 determines whether or not the TTC acquired in step S104 is equal to or less than the second threshold T2 (S110). When the TTC is larger than the second threshold T2 (S108, NO), the notification unit 15 sets the first level Lf calculated in step S108 as the saliency level SL (S114), outputs an approach alarm at the set saliency level SL (S126), and ends the processing.

When the TTC is equal to or less than the second threshold T2 (S110, YES), the notification unit 15 calculates the coefficient k2 for use in the calculation of the second level Ls according to the expression (5) described above (S112).

The notification unit 15 then determines whether or not the own vehicle 2 is accelerating (S116). Then, according to expression (6), the notification unit 15 sets a coefficient k3 for use in the calculation of the second level Ls to 1 when the own vehicle 2 is not accelerating (S118), and sets the coefficient k3 to a value less than 1, that is, for example, 0.8 (S120) when the own vehicle 2 is accelerating (S116, YES).

Next, the notification unit 15 calculates the second level Ls and the third level Lt according to the expressions (2) and (3) (S122). Then, the notification unit 15 sets the calculated third level Lt as the saliency level SL (S124), outputs the approach alarm at the set saliency level SL (S126), and ends the processing.

Without being limited to the embodiments disclosed, the present invention can be carried out in various modes without departing from the meaning thereof.

Configurations Supported by Embodiments

The embodiments disclosed support the following configurations.

(Configuration 1) An attention calling system, including a time headway (THW) acquisition unit that repeatedly acquires THW at predetermined time intervals, the THW being a value obtained by dividing an inter-vehicle distance between an own vehicle and a preceding vehicle by vehicle speed of the own vehicle, a time to collision (TTC) acquisition unit that repeatedly acquires TTC at predetermined time intervals, the TTC being a value obtained by dividing the inter-vehicle distance by relative speed between the own vehicle and the preceding vehicle, and a notification unit that outputs to an occupant of the own vehicle an approach alarm that notifies an approach to the preceding vehicle, based on the THW and the TTC. The notification unit determines a saliency level that is a degree of saliency of the approach alarm in accordance with the THW and the TTC, and outputs the approach alarm of the determined saliency level.

Since the attention calling system in the configuration 1 outputs an approach alarm at the saliency level based on the THW indicating the closeness to the preceding vehicle and the TTC indicating the level of approach to the preceding vehicle, it becomes possible to notify to the driver of the own vehicle the magnitude of a temporally changing risk of collision between the own vehicle and the preceding vehicle, in a manner highly consistent with the perception of the driver.

(Configuration 2) The attention calling system according to the configuration 1, in which when the THW becomes equal to or less than a first threshold, the notification unit sets the saliency level to a magnitude of a first level that increases monotonically as the THW decreases, and when the THW is equal to or less than the first threshold and the TTC becomes equal to or less than a second threshold, the notification unit sets the saliency level to a magnitude of a third level that is obtained by adding a second level to the first level, the second level increasing monotonically as the TTC decreases.

According to the attention calling system in the configuration 2, the approach alarm is output at the saliency level corresponding only to the THW until the TTC becomes equal to or less than the second threshold T2. This makes it possible to prevent an excessive approach alarm from being given to annoy the driver during the period where the risk of contact between the preceding vehicle and the own vehicle 2 is relatively low.

(Configuration 3) The attention calling system according to the configuration 2, in which the notification unit calculates the first level that increases monotonically with respect to an inverse number of the THW, and calculates the second level that increases monotonically with respect to an inverse number of the TTC.

According to the attention calling system in the configuration 3, the saliency level does not increase linearly with the decrease of the THW and the TTC, but an increase rate of the saliency level increases as the THW and the TTC decreases. Therefore, the saliency level can change in the manner closer to the perception or the sense of the driver caused by the approach of the preceding vehicle. As a result, the driver's acceptance and understanding of the approach alarm can further be enhanced.

(Configuration 4) The attention calling system according to the configuration 2 or 3, in which the notification unit sets the second level to a larger value as the value of the THW when the TTC becomes equal to or less than the second threshold is smaller.

According to the attention calling system in the configuration 4, as the inter-vehicle distance at the moment when the TTC becomes equal to or less than the second threshold T2 is smaller, the saliency level of the approach alarm thereafter can be increased more so as to notify the urgency of the risk of contact to the driver.

(Configuration 5) The attention calling system according to any one of the configurations 2 to 4, in which when the own vehicle is accelerating, the notification unit sets the second level to a smaller value than when the own vehicle is not accelerating.

According to the attention calling system in the configuration 5, the saliency level of the approach alarm when the driver is intentionally accelerating the own vehicle, as in the case where the own vehicle attempts to overtake a preceding vehicle, is lower than the saliency level when the driver is not accelerating the own vehicle. This makes it possible to prevent an excessive approach alarm from annoying the driver.

(Configuration 6) An attention calling method executed by a computer of an attention calling system, including a time headway (THW) acquisition step of repeatedly acquiring THW at predetermined time intervals, the THW being a value obtained by dividing an inter-vehicle distance between an own vehicle and a preceding vehicle by vehicle speed of the own vehicle, a time to collision (TTC) acquisition step of repeatedly acquiring TTC at predetermined time intervals, the TTC being a value obtained by dividing the inter-vehicle distance by relative speed between the own vehicle and the preceding vehicle, and a notification step of outputting to an occupant of the own vehicle an approach alarm that notifies an approach to the preceding vehicle, based on the THW and the TTC. In the notification step, a saliency level that is a degree of saliency of the approach alarm is determined in accordance with the THW and the TTC, and the approach alarm of the determined saliency level is output.

According to the attention calling method in the configuration 5, an approach alarm is output at the saliency level based on the THW indicating the closeness to the preceding vehicle and the TTC indicating the level of approach to the preceding vehicle. This makes it possible to notify to the driver of the own vehicle the magnitude of a temporally changing risk of collision between the own vehicle and the preceding vehicle, in a manner highly consistent with the perception of the driver.

REFERENCE SIGNS LIST

1 . . . attention calling system, 2 . . . own vehicle, 3 . . . vehicle speed sensor, 4 . . . object detector, 5 . . . HMI device, 10 . . . processor, 11 . . . memory, 12 . . . program, 13 . . . THW acquisition unit, 14 . . . TTC acquisition unit, 15 . . . notification unit, 20 . . . preceding vehicle 25 . . . road 25

What is claimed is:

1. An attention calling system, comprising a processor that includes:
    a time headway (THW) acquisition unit that repeatedly acquires THW at predetermined time intervals, the THW being a value obtained by dividing an inter-vehicle distance between an own vehicle and a preceding vehicle by vehicle speed of the own vehicle;
    a time to collision (TTC) acquisition unit that repeatedly acquires TTC at predetermined time intervals, the TTC being a value obtained by dividing the inter-vehicle distance by relative speed between the own vehicle and the preceding vehicle; and
    a notification unit that outputs to an occupant of the own vehicle an approach alarm that notifies an approach to the preceding vehicle, based on the THW and the TTC, wherein
    the notification unit determines a saliency level that is a degree of saliency of the approach alarm in accordance with the THW and the TTC, and outputs the approach alarm of the determined saliency level,
    when the THW becomes equal to or less than a first threshold, the notification unit sets the saliency level to a magnitude of a first level that increases monotonically as the THW decreases, and
    when the THW is equal to or less than the first threshold and the TTC becomes equal to or less than a second threshold, the notification unit sets the saliency level to a magnitude of a third level that is obtained by adding a second level to the first level, the second level monotonically increasing as the TTC decreases.

2. The attention calling system according to claim 1, wherein
    the notification unit
        calculates the first level that increases monotonically with respect to an inverse number of the THW, and
        calculates the second level that increases monotonically with respect to an inverse number of the TTC.

3. The attention calling system according to claim 1, wherein
    the notification unit sets the second level to a larger value as the value of the THW when the TTC becomes equal to or less than the second threshold is smaller.

4. The attention calling system according to claim 1, wherein when the own vehicle is accelerating, the notification unit sets the second level to a smaller value than when the own vehicle is not accelerating.

5. An attention calling method executed by a computer of an attention calling system, comprising:

a time headway (THW) acquisition step of repeatedly acquiring THW at predetermined time intervals, the THW being a value obtained by dividing an inter-vehicle distance between an own vehicle and a preceding vehicle by vehicle speed of the own vehicle;

a time to collision (TTC) acquisition step of repeatedly acquiring TTC at predetermined time intervals, the TTC being a value obtained by dividing the inter-vehicle distance by relative speed between the own vehicle and the preceding vehicle; and a notification step of outputting to an occupant of the own vehicle an approach alarm that notifies an approach to the preceding vehicle, based on the THW and the TTC, wherein in the notification step, a saliency level that is a degree of saliency of the approach alarm is determined in accordance with the THW and the TTC, and the approach alarm of the determined saliency level is output, in the notification step, when the THW becomes equal to or less than a first threshold, the saliency level is set to a magnitude of a first level that increases monotonically as the THW decreases, and in the notification step, when the THW is equal to or less than the first threshold and the TTC becomes equal to or less than a second threshold, the saliency level is set to a magnitude of a third level that is obtained by adding a second level to the first level, the second level monotonically increasing as the TTC decreases.

* * * * *